(12) United States Patent
Kim et al.

(10) Patent No.: US 7,767,752 B2
(45) Date of Patent: *Aug. 3, 2010

(54) ACRYLIC PRESSURE SENSITIVE ADHESIVE HAVING ANTISTATIC PROPERTY

(75) Inventors: Se-ra Kim, Daejeon (KR); In-Cheon Han, Seoul (KR); Suk-ky Chang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 267 days.

This patent is subject to a terminal disclaimer.

(21) Appl. No.: 11/209,042

(22) Filed: Aug. 23, 2005

(65) Prior Publication Data

US 2006/0045990 A1    Mar. 2, 2006

(30) Foreign Application Priority Data

Aug. 24, 2004    (KR) .................. 10-2004-0066880

(51) Int. Cl.
| | |
|---|---|
| *C08L 33/06* | (2006.01) |
| *C08L 55/00* | (2006.01) |
| *C08K 5/00* | (2006.01) |
| *C08K 5/06* | (2006.01) |
| *C08K 3/10* | (2006.01) |
| *C09J 7/02* | (2006.01) |

(52) U.S. Cl. .................. 524/560; 524/566; 524/81; 524/378; 524/366; 524/401

(58) Field of Classification Search ............... 524/560, 524/566, 81, 378, 366, 401
See application file for complete search history.

(56) References Cited

U.S. PATENT DOCUMENTS

| | | | | |
|---|---|---|---|---|
| 4,340,524 | A * | 7/1982 | Bullman | .................... 524/297 |
| 5,508,107 | A * | 4/1996 | Gutman et al. | .............. 428/339 |
| 6,180,742 | B1 * | 1/2001 | Kato et al. | ................ 526/328.5 |

FOREIGN PATENT DOCUMENTS

| | | |
|---|---|---|
| JP | 05-140519 | 6/1993 |
| JP | 06-128539 | 5/1994 |

* cited by examiner

*Primary Examiner*—Vasu Jagannathan
*Assistant Examiner*—Karuna P Reddy
(74) *Attorney, Agent, or Firm*—McKenna Long & Aldridge LLP

(57) ABSTRACT

The present invention relates to an acrylic pressure sensitive adhesive composition for the production of a polarizer, which has excellency in major characteristics including durability and antistatic property, more precisely, an acrylic pressure sensitive adhesive composition containing ester plasticizer having one or more ether bonds and alkali metallic salt, a polarizer applied with the pressure sensitive adhesive and liquid crystal display (LCD) device using the same. The acrylic pressure sensitive adhesive composition for the production of a polarizer of the present invention has excellent pressure sensitive adhesive functions and durability.

9 Claims, No Drawings

ACRYLIC PRESSURE SENSITIVE ADHESIVE HAVING ANTISTATIC PROPERTY

This application claims priority to Korean Patent Application No. 10-2004 0066880, filed Aug. 24, 2004, which is hereby incorporated by reference in its entirety.

TECHNICAL FIELD

The present invention relates to an acrylic pressure sensitive adhesive composition having antistatic property, more precisely, an acrylic pressure sensitive adhesive resin composition having excellent durability and antistatic property as well.

BACKGROUND ART

Acrylic pressure sensitive adhesive compositions have been widely used in industry for the production of industrial sheet, optical pressure sensitive adhesive product, and pressure sensitive adhesive for electrical components, etc, and are applied to other industrial fields with the same conception.

Among many products, liquid crystal display (LCD) is taking the place of CRT to be used in various high-tech fields producing notebook computer, monitor, TV, etc, owing to its potential for weight reduction and slimness.

In general, to produce LCD, liquid crystal cell and polarizer are basically required, and for the adhesion of the two, proper pressure sensitive adhesive layer should be applied. Polarizer includes multilayer such as a row of iodine compounds or dichroic polarizing material, protective film, such as triacetyl cellulose (TAC), to protect polarizing element on both sides, pressure sensitive adhesive layer, and releasing film, etc.

The production of LCD includes the process of adhering polarizer, during which static electricity is generated after peeling releasing film out of pressure sensitive adhesive layer. The generated static electricity affects orientation of liquid crystal in LCD, resulting in defectives.

Generation of static electricity can be inhibited by forming antistatic layer outside polarizer, whose effect is, though, too low to prevent the fundamental generation of static electricity. Therefore, in order to prevent the generation of static electricity in the first place, it is important for a pressure sensitive adhesive to have an antistatic property.

To solve the problem of static electricity, various attempts have been made such as adding metal powders having conductivity or conductive components such as carbon particles to pressure sensitive adhesive, adding ionic substances like surfactants to pressure sensitive adhesive, etc. However, in order for conductive components or carbon particles to prevent the generation of static electricity, a large amount of them has to be added, dropping the transparency. And the addition of surfactants to pressure sensitive adhesive results in the decrease of the pressure sensitive adhesive property by transitivity to the surface of the pressure sensitive adhesive and the product vulnerable for humidity.

An attempt has been made to prevent the generation of static electricity by making a pressure sensitive adhesive flexible by adding ethylene oxide denatured phthalic acid dioctyl plasticizer to the pressure sensitive adhesive (Japanese Patent Publication No. 5-140519). However, the addition of such plasticizer only cannot prevent the fundamental generation of static electricity and not to eliminate static electricity remaining after the separation of releasing film, either.

In Japanese Patent Publication No. 6-128539, it is described that static electricity is prevented by mixing polyether polyol compound and at least one of alkali metallic salt to an acrylic pressure sensitive adhesive. But, when polyether polyol compound is added to a pressure sensitive adhesive having isocyanate crosslinking agent, the crosslinking degree is affected greatly. To avoid of such affection on the crosslinking degree, the inventors of the above patent tried to make crosslinking first by using isocyanate crosslinking agent, and then dissolved the composition again to mix polyether polyol compound and added alkali metallic salt thereto. However, such processes are very difficult to be applied in real industry.

Therefore, it is required to develop a pressure sensitive adhesive having excellent antistatic property without changing of compatibility and durability.

Thus, the present inventors tried to solve the above mentioned problems, and found that the generation of static electricity can be satisfactorily inhibited when ester plasticizer having excellent compatibility and at least one of ether bonds in its molecule and alkali metallic salt are added together to a pressure sensitive adhesive. And, the present inventors completed this invention by producing an acrylic pressure sensitive adhesive composition having antistatic property without damaging durability by adding the above ester plasticizer and alkali metallic salt together to an acrylic pressure sensitive adhesive.

DISCLOSURE OF THE INVENTION

The above objects of the present invention can be achieved by the preferred embodiments of the invention described hereinafter.

The present invention relates to an acrylic pressure sensitive adhesive composition having antistatic property, more precisely, an acrylic pressure sensitive adhesive composition containing ester plasticizer having at least one of ether bonds and alkali metallic salt.

The present invention provides an acrylic pressure sensitive adhesive composition comprising a) 100 weight part of acrylic copolymer;

b) 0.01-20 weight part of ester plasticizer having at least one of ether bonds, represented by formula 1;

c) 0.001-7 weight part of alkali metallic salt; and d) 0.01-10 weight part of multifunctional crosslinking agent.

The ester plasticizer having one or more ether bonds is represented by the following formula 1.

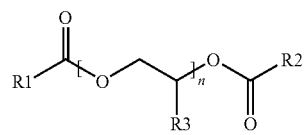

[Formula 1]

Wherein, R1 and R2 are independently C1-C20 alkyl or aryl, R3 is H or methyl, and n is an integer of 2-20.

More precisely, the acrylic copolymer of a) is characteristically prepared by the copolymerization of 90-99.9 weight part of (meth)acrylic acid ester monomer having C1-C12 alkyl and 0.1-10 weight part of vinyl and/or acrylic monomer having a functional group capable of crosslinking.

The present invention also provides a polarizer containing the above acrylic pressure sensitive adhesive composition as a pressure sensitive adhesive layer on one side or both sides of polarizing film.

The polarizer can additionally contain one or more layers selected from a group consisting of protective layer, reflecting layer, phase retardation film, compensation film for wide view angle and brightness enhancing film.

The present invention further provides a liquid crystal display containing liquid crystal panel in which above polarizer is adhered on one side or both sides of liquid crystal cell.

Hereinafter, the present invention is described in detail.

The present invention endowed enhanced antistatic property to an acrylic pressure sensitive adhesive by adding ester plasticizer having one or more ether bonds and alkali metallic salt together to the pressure sensitive adhesive. This attempt was made based on the theory that ionic conductivity is given to a pressure sensitive adhesive by forming complex with ether bonds among ester plasticizer molecules and cations of alkali metallic salt. In particular, ester plasticizer having ether bonds is a key factor to enhance compatibility, durability, and antistatic property of a pressure sensitive adhesive.

Each component of the above pressure sensitive adhesive is described in detail hereinafter.

In the present invention, it is preferred that (meth)acrylic acid ester monomer having C1-C12 alkyl is included by 90-99.9 weight part for 100 weight part of the acrylic copolymer. When the content is lower than 90 weight part, the initial peel strength is decreased, and when the content is higher than 99.9 weight part, cohesion becomes dropped, resulting in the low durability.

As a (meth)acrylic acid ester monomer having C1-C12 alkyl, C1-C12 alkyl ester can be used. In particular, C2-C8 alkyl ester is preferred. When alkyl of the alkyl(meth)acrylate is in the form of long chain, cohesion of the pressure sensitive adhesive drops. Thus, to maintain the cohesion under high temperature, C1-C12 alkyl is preferably used, and C2-C8 alkyl is more preferred. The (meth)acrylic acid ester monomer having C1-C12 alkyl is exemplified by butyl(meth)acrylate, 2-ethylhexyl(meth)acrylate, ethyl(meth)acrylate, methyl(meth)acrylate, n-propyl(meth)acrylate, isopropyl(meth)acrylate, t-butyl(meth)acrylate, pentyl(meth)acrylate, n-octyl(meth)acrylate, isooctyl(meth)acrylate, or isononyl(meth)acrylate, etc, and these can be used independently or jointly.

In the present invention, copolymer monomer can be additionally included in acrylic copolymer to regulate the glass transition temperature of a pressure sensitive adhesive or to endow other functional properties thereto. At this time, monomers such as acrylonitrille, (meth)acrylamide, styrene, methylstyrene, vinyltoluene, glycidyl(meth)acrylate or vinylacetate are preferably used.

Vinyl monomer and acrylic monomer of a) having a functional group capable of crosslinking endow cohesion or peel strength by chemical bond not to destroy cohesion of a pressure sensitive adhesive by high temperature or high humidity by reacting with other crosslinking agents.

The preferable content of vinyl monomer and acrylic monomer of a) or the mixture of them having a functional group capable of crosslinking, is 0.1-10 weight part. When the content of a monomer having a functional group capable of crosslinking is less than 0.1 weight part, the cohesion is easily broken under high temperature or high humidity, resulting in the lowering effect on peel strength. On the contrary, when the content of such monomer is more than 10 weight part, compatibility is remarkably decreased, causing surface migration, fluidity is reduced and cohesion is increased, losing stress relaxation.

The monomer having a functional group capable of crosslinking is exemplified by monomers containing hydroxy such as 2-hydroxyethyl(meth)acrylate, 2-hydroxypropyl(meth)acrylate, 4-hydroxybutyl(meth)acrylate, 2-hydroxyethyleneglycol(meth)acrylate, 2-hydroxypropyleneglycol(meth)acrylate, and monomers containing carboxylic acid such as acrylic acid, methacrylic acid, acrylic acid dimer, itaconic acid, maleic acid, and maleic anhydride, etc, but not always limited thereto. These monomers can be used independently or jointly.

It is preferred to eliminate factors generating bubbles such as volatile components, reaction residues, etc, from a pressure sensitive adhesive, before using. When elastic modulus of a pressure sensitive adhesive is too low, resulted from low crosslinking density or molecular weight, bubbles generated between glass substrate and pressure sensitive adhesive layer at high temperature are growing to form a scatterer in inside of the pressure sensitive adhesive layer. In the meantime, when a pressure sensitive adhesive with high elastic modulus is applied, edge lifting is observed at the end of pressure sensitive adhesive sheet, resulted from excessive crosslinking reaction.

The viscoelastic property of a pressure sensitive adhesive depends on molecular weight of polymer chain, distribution of molecular weight, or abundant numbers of molecular structures, and in particular it might be determined by molecular weight. Thus, the preferable molecular weight of acrylic copolymer used in the present invention is 800,000-2,000,000 and the copolymer of the invention can be prepared by the conventional radical copolymerization.

The method for the production of acrylic copolymer of the present invention is not limited to a specific one but solution polymerization, photo-polymerization, bulk polymerization, suspension polymerization, and emulsion polymerization are preferred and in particular solution polymerization is more preferred. It is also preferred to set the temperature between 50-140° C., and to add an initiator after monomers are evenly mixed.

In the pressure sensitive adhesive composition of the present invention, ester plasticizer having one or more ether bonds, represented by formula 1, in the above b) forms a complex together with alkali metallic salt of the above c), resulting in ionic conductivity of the pressure sensitive adhesive. The ester plasticizer is optically transparent and has excellent compatibility and no surface migration.

The ester plasticizer having one or more ether bonds is represented by the following formula 1.

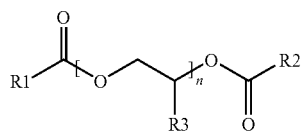

[Formula 1]

Wherein, R1 and R2 are independently C1-C20 alkyl or aryl, R3 is H or methyl, and n is an integer of 2-20.

The preferable content of the ester plasticizer having one or more ether bonds, presented by formula 1, is 0.01-20 weight part for 100 weight part of the acrylic copolymer of the above a). When the content of ester plasticizer having one or more ether bonds is less than 0.01 weight part, it cannot properly form a complex with alkali metallic salt, resulting in the decrease of antistatic property. In the meantime, the content of the plasticizer is over 20 weight part, cohesion of a pressure sensitive adhesive is reduced, resulting in the decrease of durability.

The ester plasticizer having one or more ether bonds, represented by formula 1, is exemplified by diethylene glycol di-2-ethylhexonate, tetraethylene glycol di-2-ethylhexonate, polyethylene glycol di-2-ethylhexonate, triethylene glycol diethylbutylate, polyethylene glycol diethylbutylate, polypropylene glycol diethylhexonate, triethylene glycol dibenzonate, polyethylene glycol dibenzonate, polypropylene glycol dibenzonate, polyethylene glycol-2-ethylhexonate benzonate, etc, and these plasticizers can be used independently or jointly.

The alkali metallic salt of the above c) is also involved in antistatic property by forming a complex together with ether bonds of ester plasticizer of the above b). The addition of alkali metallic salt itself endows antistatic property to an acrylic pressure sensitive adhesive, and the co-treatment with ester plasticizer having one or more ether bonds enhances ionic conductivity.

It is preferred for the alkali metallic salt to be included by 0.001-7 weight part to 100 weight part of the acrylic copolymer of a). When the content of alkali metallic salt is less than 0.001 weight part, it is difficult to form a complex together with ether bonds of ester plasticizer, resulting in the decrease of antistatic property. When the content of alkali metallic salt is over 7 weight part, crystallization is occurred, resulting in the decrease of transparency and durability of a pressure sensitive adhesive.

The alkali metallic salt is composed of cations and anions. Precisely, the alkali metallic salt is composed of a kind of ionic combination made from a cation selected from a group consisting of lithium, sodium, potassium, magnesium, calcium, barium, and cesium and an anion selected from a group consisting of chloride, bromide, iodide, perclorate, trifluoromethanesulfonate, hexafluorophosphate, tetraborate, and carbonate, and is used independently or jointly.

In the pressure sensitive adhesive composition of the present invention, the multifunctional crosslinking agent of the above d) increases cohesion of the pressure sensitive adhesive by reacting with carboxyl and hydroxy. The preferable content of the crosslinking agent is 0.01-10 weight part for 100 weight part of acrylic copolymer of a).

The multifunctional crosslinking agent can be selected among isocyanate, epoxy, aziridine, metal chelate crosslinking agents, etc, and in particular isocyanate crosslinking agent is preferred. Isocyanate crosslinking agent is exemplified by tolylene diisocyanate, xylene diisocyanate, diphenylmethane diisocyanate, hexamethylene diisocyanate, isoforon diisocyanate, tetramethyl xylene diisocyanate, naphthalene diisocyanate, and their reactants with polyol like trimethylolpropane, etc.

The epoxy crosslinking agent is exemplified by ethyleneglycol diglycidylether, triglycidylether, trimethylolpropane triglycidylether, N,N,N'N'-tetraglycidylethylenediamine, glycerine diglycidylether, etc.

The aziridine crosslinking agent is exemplified by N,N'-toluene-2,4-bis(1-aziridinecarboxide), N,N'-diphenylmethane-4,4'-bis(1-aziridinecarboxide), triethylenemelamine, bisisoprotaloyl-1-(2-methylaziridine), tri-1-aziridinylphosphineoxide, etc.

As a metal chelate crosslinking agent, compounds prepared by coordination of multivalent metal such as Al, Fe, Zn, Sn, Ti, Sb, Mg, and V with acethylacetone or ethyl acetoacetate can be used.

A preparation method of the pressure sensitive adhesive composition of the present invention is not limited to a specific one but in general, it is produced by mixing an acrylic copolymer and a crosslinking agent.

At this time, a crosslinking reaction of functional groups of a crosslinking agent must not be induced for even coating during the mixing process to form pressure sensitive adhesive layer. After coating, a crosslinking structure is formed through dryness and aging, resulting in a pressure sensitive adhesive layer having a strong elasticity and cohesion. By the strong cohesion, pressure sensitive adhesive property such as durability and cutting characteristic of a pressure sensitive adhesive product are enhanced.

The proper crosslinking density of the acrylic pressure sensitive adhesive composition of the present invention is 5-95%, for the optimum substantial balance. The crosslinking density is calculated by the conventional quantification method of gel content in acrylic pressure sensitive adhesive, which calculates the parts forming a crosslinking structure dissoluble in a solvent by weight %. When the crosslinking density of the pressure sensitive adhesive is under 5%, cohesion of the pressure sensitive adhesive is reduced, causing weakness of durability, to form bubbles or induce edge lifting. On the contrary, when the crosslinking density is over 95%, durability is remarkably reduced.

The pressure sensitive adhesive composition of the present invention can additionally include silane coupling agent, which is able to enhance thermal/moisture resistance by improving pressure sensitive adhesive stability on the glass substrate. Such silane coupling agent plays a role in the increase of peel strength when it is left for a long time under high temperature and high humidity. The preferable content of silane coupling agent is 0.005-5 weight part for 100 weight part of an acrylic copolymer.

The silane coupling agent is exemplified by γ-glycycloxypropyl trimethoxysilane, γ-glycycloxypropyl methyldiethoxysilane, γ-glycycloxypropyl triethoxysilane, 3-mercaptopropyl trimethoxysilane, vinyl trimethoxysilane, vinyl triethoxysilane, γ-methacryloxypropyl trimethoxysilane, γ-methacryloxypropyl triethoxysilane, γ-aminopropyl trimethoxysilane, γ-aminopropyl triethoxysilane, 3-isocyanatepropyl triethoxysilane, γ-acetoacetatepropyl trimethoxysilane, etc. These silane coupling agents can be used independently or jointly.

To regulate the pressure sensitive adhesive property, a pressure sensitive adhesive resin can be additionally added to the tackifier of the present invention, and the content thereof is determined in the range of 1-100 weight part for 100 weight part of an acrylic copolymer. At this time, when the tackifier is over-treated, compatibility and cohesion of a pressure sensitive adhesive decrease, so the content of the pressure sensitive adhesive resin has to be properly regulated.

The tackifier is exemplified by (hydrogenated)hydrocarbon resin, (hydrogenated)rosin resin, (hydrogenated)rosinester resin, (hydrogenated)terpene resin, (hydrogenated) terpenetenol resin, polymerized rosin resin, and polymerized rosinester resin, etc, and these resins can be used singly or jointly.

In addition, to achieve the objects of the present invention, acrylic low molecular weight substances, epoxy resins and hardners can be additionally included. UV stabilizers, antioxidants, coloring agents, reinforcing agents, fillers, antifoaming agents, surfactants, plasticizer, etc, can also be added.

The present invention further provides a polarizer containing the acrylic pressure sensitive adhesive composition as a pressure sensitive adhesive layer of polarizing film.

The polarizer of the present invention has a pressure sensitive adhesive layer formed from the pressure sensitive adhesive composition of the invention on one side or both sides of the polarizing film. Polarizing film or polarizing device forming polarizer is not limited to a specific one.

However, it is preferred to prepare the polarizing film by elongation by adding a polarizing component such as iodine or dichroic dye onto polyvinyl alcohol resin film, and there is no limitation in thickness of polarizing film, which means conventional thickness of film is accepted. As a polyvinyl alcohol resin, polyvinyl alcohol, polyvinyl formal, polyvinyl acetal and ethylene, saponified vinyl acetate copolymer, etc can be used.

On both sides of the polarizing film, protective films are laminated to form a multi-layer film, and the protective films are cellulose film such as triacetyl cellulose, etc, polyester film such as polycarbonate film, polyethylene terephthalate, etc, polyether sulphone film, polyolefin film including those having the structure of polyethylene, polypropylene, cyclo or norbornene, and ethylene propylene copolymer. The thickness of such protective films is not fixed and conventional film thickness is accepted.

A method for forming pressure sensitive adhesive layer on polarizing film is not limited, either, but generally, a method comprising the steps of coating the pressure sensitive adhesive directly on the surface of the polarizing film with Bar Coater and then drying thereof, or a method comprising the steps of coating the pressure sensitive adhesive on the surface of dissecting substrate, drying, transfering of the pressure sensitive adhesive layer formed on the surface of the dissecting substrate onto the surface of polarizing film, and aging is applicable.

The polarizer of the present invention can include one or more additional layers providing supplementary functions, which might be protective layer, reflecting layer, phase retardation film, compensation film for wide view angle and brightness enhancing film.

The polarizer loaded with the pressure sensitive adhesive of the present invention can be applied to every LCD generally used, and liquid crystal panel is not limited. It is preferred in the present invention to construct LCD including liquid crystal panel prepared by conjugating the pressure sensitive adhesive polarizer to one side or both sides of liquid crystal cell.

The acrylic pressure sensitive adhesive resin composition of the present invention can be widely used without limitation, for example for industrial sheet in particular reflective sheet, structural pressure sensitive adhesive sheet, photographic pressure sensitive adhesive sheet, lane marking pressure sensitive adhesive sheet, optical pressure sensitive adhesive product, pressure sensitive adhesive for electronic components, etc. The pressure sensitive adhesive composition can also be applied to the equal operating field such as the production of multi-layer laminate products, for example general industrial pressure sensitive adhesive sheet products, medical patches, heat activated pressure sensitive pressure sensitive adhesives, etc.

As explained hereinbefore, the pressure sensitive adhesive composition of the present invention has excellent long-term durability and improved antistatic property by containing ester plasticizer having one or more ether bonds and alkali metallic salt.

BEST MODE FOR CARRYING OUT THE INVENTION

Practical and presently preferred embodiments of the present invention are illustrative as shown in the following Examples.

However, it will be appreciated that those skilled in the art, on consideration of this disclosure, may make modifications and improvements within the spirit and scope of the present invention.

Example 1

Preparation of an Acrylic Copolymer

A monomer mixture composed of 98.3 weight part of n-butylacrylate (BA), 0.5 weight part of acrylic acid (AA), and 1.2 weight part of hydroxyethylmethacrylate (2-HEMA) is put into a 1 L reactor equipped with cooling system for the reflux of nitrogen gas and the regulation of temperature, to which 100 weight part of ethyl acetate (EAc) was added as a solvent. To remove oxygen therefrom, nitrogen gas was purged for 1 hour, during which the temperature was kept at 62° C. After homogenization, azobisisobutyronitrile (AIBN), which was 50% diluted in ethyl acetate, was added as a reaction initiator by 0.03 weight part. The mixture was reacted for 8 hours, resulting in an acrylic copolymer.

Mixing Process

To 100 weight part of the acrylic copolymer prepared above, 0.5 weight part of tolylene diisocyanate adduct of trimethylolpropane (TDI-1), a crosslinking agent, 5 weight part of tetraethylene glycol di-2-ethylhexonate and 4.0 weight part of lithium perchlorate were added. The mixture was diluted properly considering better chance of coating, followed by homogenization. After coating on releasing paper, the paper was dried, resulting in an even pressure sensitive adhesive layer in thickness of 25 micron.

Laminating Process 185 micron thick iodine polarizer was coated with the pressure sensitive adhesive layer prepared above, and then cut into proper sizes for evaluation. The results of the evaluation are shown in Table 2.

Examples 2-4

As shown in Table 1, the contents of some of components were down-regulated or up-regulated, based on the composition of Example 1, for copolymerization. Except the down- or up-regulation during the mixing procedure, preparing, mixing and laminating of an acrylic copolymer were preceded by the same method as described in Example 1. Durability and surface resistance were also examined by the same method as described in Example 1 and the results are shown in Table 2.

Comparative Examples 1-7

As shown in Table 1, the contents of some of components were down-regulated or up-regulated, based on the composition of Example 1, for copolymerization. Except the down- or up-regulation during the mixing procedure, preparing, mixing and laminating of an acrylic copolymer were preceded by the same method as described in Example 1. Durability and surface resistance were also examined by the same method as described in Example 1 and the results are shown in Table 2.

[Evaluation Test]

Durability

The polarizer (90 mm×170 mm) coated with the pressure sensitive adhesive prepared above was attached onto the both sides of glass substrate (110 mm×190 mm×0.7 mm), on which optical absorption axis was crossed. Approximately 5 kg/cm$^2$ of pressure was given in a clean room to prevent the generations of bubbles and impurities. Those test samples were left at 60° C. under 90% relative humidity for 1,000 hours to investigate moisture and heat resistances by observing the generation of bubbles or edge lifting. The test samples were left at 80° C. for 1,000 hours to investigate heat resistance by observing the generation of bubbles or edge lifting. The test samples were left at room temperature for 24 hours right before the evaluation of the state of them, then the generation of bubbles or edge lifting was observed. The evaluation criteria for durability are as follows.

○: No bubbles or edge lifting was observed.
□: A few bubbles or edge lifting was observed.
X: A large amount bubbles or edge lifting was observed.

Surface Resistance

After separating releasing film from the polarizer coated with the pressure sensitive adhesive prepared above, surface resistance of the pressure sensitive adhesive face was measured. Precisely, surface resistance was measured after giving 500 V of electricity for 1 minute at 23° C., with 50% relative humidity.

TABLE 1

|  |  | Ex. 1 | Ex. 2 | Ex. 3 | Ex. 4 | C. E1 | C. E2 | C. E3 | C. E4 | C. E5 | C. E6 | C. E7 |
|---|---|---|---|---|---|---|---|---|---|---|---|---|
| Composition | n-BA | 98.3 | 88.0 | 98.3 | 98.3 | 88.0 | 88.0 | 98.3 | 98.3 | 98.3 | 88.0 | 98.3 |
|  | EA |  | 9.5 |  |  | 9.5 | 9.5 |  |  |  | 95 |  |
|  | AA | 0.5 |  | 0.5 | 0.5 |  |  | 0.5 | 0.5 | 0.5 |  | 0.5 |
|  | 2-HEMA | 1.2 |  | 1.2 | 1.2 |  |  | 1.2 | 1.2 | 1.2 |  | 1.2 |
|  | 4-HBA |  | 2.5 |  |  | 2.5 | 2.5 |  |  |  | 2.5 |  |
| Composition | Crosslinking agent | 0.5 | 0.5 | 0.5 | 0.5 | 0.5 | 0.5 | 0.5 | 0.5 | 0.5 | 0.5 | 0.5 |
|  | Plasticizer |  |  |  |  |  |  |  |  |  |  |  |
|  | P-1 | 5.0 |  |  |  | 7.4 |  | 5.0 |  | 0.0 | 5.0 |  |
|  | P-2 |  | 0.2 |  | 2.0 | 15.2 | 0.2 |  |  |  |  |  |
|  | P-3 |  |  | 15.0 | 0.4 |  |  |  | 0.004 |  |  |  |
|  | Alkalimetal |  |  |  |  |  |  |  |  |  |  |  |
|  | $LiClO_4$ | 4.0 | 0.1 |  |  | 0.1 |  | 10.0 |  |  |  | 4.0 |
|  | $LiSO_3CR_3$ |  |  | 0.6 |  |  |  |  |  |  |  |  |
|  | $NaClO_4$ |  | 0.03 |  | 0.02 | 0.03 | 0.0005 |  | 0.02 | 0.02 |  |  |
|  | Polyol |  |  |  |  |  |  |  |  |  |  | 5.0 |

Ex.: Example
C. E: Comparative Example
n-BA: n-butylacrylate
EA: Ethylacrylate
2-HEMA: 2-hydroxyethylmethacrylate
4-HBA: 4-hydroxybutylacrylate
AA: Acrylic acid
P-1: Tetraethyleneglycol di-2-ethylhexonate
P-2: Polyethyleneglycol(n = ~12) di-2-ethylhexonate
P-3: Triethyleneglycol dibenzonate
$LiClO_4$: Lithium perchlorate
$LiSO_3CF_3$: Lithiumtrifluoromethanesulfonate
$NaClO_4$: Sodium perchiorate
Polyol: Poly(ethyleneglycol) (n = ~8)

TABLE 2

| | Durability | | Surface | |
|---|---|---|---|---|
| | 80° C., 1000 hr | 60° C., 90% R.H., 1000 hr | Resistance ($\Omega/\square$) | Remark |
| Example 1 | ○ | ○ | $8.0 \times 10^9$ | |
| Example 2 | ○ | ○ | $3.1 \times 10^{10}$ | |
| Example 3 | ○ | ○ | $2.0 \times 10^{11}$ | |
| Example 4 | ○ | ○ | $1.2 \times 10^{12}$ | |
| Comparative Example 1 | x | x | $1.3 \times 10^{11}$ | |
| Comparative Example 2 | ○ | ○ | $1.0 \times 10^{14}$ | |
| Comparative Example 3 | x | x | $1.0 \times 10^9$ | Crystallization |
| Comparative Example 4 | ○ | ○ | $8.4 \times 10^{13}$ | |
| Comparative Example 5 | ○ | ○ | $9.7 \times 10^{13}$ | |
| Comparative Example 6 | ○ | ○ | $3.0 \times 10^{14}$ | |
| Comparative Example 7 | x | x | $1.2 \times 10^{10}$ | Non-crosslinking |

As shown in Table 2, the compositions of Example 1-4 of the present invention were proved to have excellent durability and antistatic property, compared with those of Comparative Examples 1-7.

INDUSTRIAL APPLICABILITY

The acrylic pressure sensitive adhesive composition of the present invention shows excellency in major characteristics including durability and antistatic property.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:
1. An acrylic pressure sensitive adhesive composition comprising,
   a) 100 weight part of acrylic copolymer, wherein the acrylic copolymer of a) is prepared by solution copolymerization of 90-99.9 weight part of (meth)acrylic acid ester monomer having C2-C8 alkyl and 0.1-10 weight part of vinyl and/or acrylic monomer having a functional group capable of crosslinking;
   b) 0.2-15 weight part of ester plasticizer having one or more ether bonds, represented by formula 1;
   c) 0.02-4 weight part of alkali metallic salt selected from a group consisting of lithium perchlorate (LiClO$_4$), lithium trifluoromethane sulfonate (LiSO$_3$CF$_3$) and sodium perchlorate (NaClO$_4$); and
   d) 0.01-10 weight part of multifunctional crosslinking agent which is an isocyanate compound,

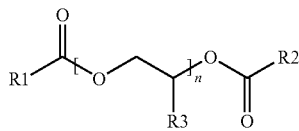
[Formula 1]

Wherein, R1 and R2 are C8 alkyl, R3 is H, and n is an integer of 4-12, or the ether plasticizer having one or more ether bonds is triethylene glycol dibenzoate.

2. The acrylic pressure sensitive adhesive composition as set forth in claim 1, wherein the (meth)acrylic acid ester monomer is C2-C8 alkyl ester selected from a group consisting of butyl (meth)acrylate, 2-ethylhexyl (meth)acrylate, ethyl (meth)acrylate, methyl (meth)acrylate, n-propyl (meth)acrylate, isopropyl (meth)acrylate, t-butyl (meth)acrylate, pentyl (meth)acrylate, n-octyl (meth)acrylate, isooctyl (meth)acrylate, and 2-ethylbutyl (meth)acrylate.

3. The acrylic pressure sensitive adhesive composition as set forth in claim 1, wherein the monomer having a functional group capable of crosslinking is selected from a group consisting of 2-hydroxyethyl (meth)acrylate, 2-hydroxypropyl (meth)acrylate, 4-hydroxybutyl (meth)acrylate, 2-hydroxyethyleneglycol (meth)acrylate, 2-hydroxypropyleneglycol (meth)acrylate, acrylic acid, methacrylic acid, acrylic acid dimer, itaconic acid, maleic acid and maleic anhydride.

4. The acrylic pressure sensitive adhesive composition as set forth in claim 1, wherein the crosslinking density of the acrylic pressure sensitive adhesive composition is in the range of 5-95%.

5. The acrylic pressure sensitive adhesive composition as set forth in claim 1, wherein the acrylic pressure sensitive adhesive composition is applied to industrial sheet, protective film, reflective sheet, structural pressure sensitive adhesive sheet, photographic pressure sensitive adhesive sheet, lane marking pressure sensitive adhesive sheet, optical pressure sensitive adhesive product, pressure sensitive adhesive for electronic components, multi-layer laminate products, general industrial pressure sensitive adhesive sheet products, medical patches, or heat activated pressure sensitive pressure sensitive adhesives.

6. A pressure sensitive adhesive polarizer in which the acrylic pressure sensitive adhesive composition of claim 1 is included in pressure sensitive adhesive layer on one side or both sides of polarizing film.

7. The pressure sensitive adhesive polarizer as set forth in claim 6, wherein the polarizer additionally contains one or more layers selected from a group consisting of protective layer, reflecting layer, phase retardation film, compensation film for wide view angle and brightness enhancing film.

8. A liquid crystal display containing liquid crystal panel in which the pressure sensitive adhesive polarizer of claim 6 is adhered on one side or both sides of liquid crystal cell.

9. A liquid crystal display containing liquid crystal panel in which the pressure sensitive adhesive polarizer of claim 7 is adhered on one side or both sides of liquid crystal cell.

* * * * *